(12) United States Patent
Lenning et al.

(10) Patent No.: US 7,686,117 B2
(45) Date of Patent: Mar. 30, 2010

(54) SAFETY ARRANGEMENT

(75) Inventors: Anders Lenning, Kungsbacka (SE); Peter Hardå, Göteborg (SE); Andreas Sandahl, Göteborg (SE); Jörgen Persson, Göteborg (SE)

(73) Assignee: Autoliv Development AB, Vargarda (SE)

( * ) Notice: Subject to any disclaimer, the term of this patent is extended or adjusted under 35 U.S.C. 154(b) by 941 days.

(21) Appl. No.: 10/559,760

(22) PCT Filed: Jun. 2, 2004

(86) PCT No.: PCT/SE2004/000841

§ 371 (c)(1),
(2), (4) Date: May 8, 2006

(87) PCT Pub. No.: WO2004/108484

PCT Pub. Date: Dec. 16, 2004

(65) Prior Publication Data

US 2006/0255574 A1      Nov. 16, 2006

(30) Foreign Application Priority Data

Jun. 6, 2003    (GB) ................................. 0313111.7

(51) Int. Cl.
*B60R 21/00*    (2006.01)

(52) U.S. Cl. ...................... 180/268; 180/274; 180/282; 280/735

(58) Field of Classification Search .................. 180/268, 180/274, 282; 280/735
See application file for complete search history.

(56) References Cited

U.S. PATENT DOCUMENTS

| | | | |
|---|---|---|---|
| 6,161,439 A | 12/2000 | Stanley | |
| 6,179,330 B1 | 1/2001 | Wier | |
| 6,616,081 B1 | 9/2003 | Clute et al. | |
| 2003/0066362 A1 | 4/2003 | Lee et al. | |
| 2003/0149517 A1 | 8/2003 | Murphy et al. | |

FOREIGN PATENT DOCUMENTS

| | | |
|---|---|---|
| EP | 0 940 307 A2 | 9/1999 |
| GB | 2 293 681 A | 4/1996 |
| JP | 2001-225723 | 8/2001 |
| WO | WO 00/76814 A1 | 12/2000 |
| WO | WO 01/00454 A1 | 1/2001 |
| WO | WO 02/26531 A2 | 4/2002 |

*Primary Examiner*—Eric Culbreth
(74) *Attorney, Agent, or Firm*—Brinks Hofer Gilson & Lione

(57) ABSTRACT

A safety arrangement incorporates a seat-belt (3) to protect an occupant (2) of a vehicle seat (1). A control unit (11) incorporates a calculator (18) to calculate the weight of the occupant (2) of the seat occupant, by comparing the force (6) applied to the seat-belt by the seat occupant with the acceleration (14) of the compartment. A controller (19) controls a restraining force applied to the seat occupant by the safety-belt and, possibly, additional force limiting or energy absorbing devices such as an air-bag (8).

25 Claims, 3 Drawing Sheets

SAFETY ARRANGEMENT

CROSS REFERENCE TO RELATED APPLICATIONS

This application claims priority to Great Britain patent application number 0313111.7, filed Jun. 6, 2003, and PCT/SE2004/000841, filed Jun. 2, 2004.

FIELD OF THE INVENTION

THE PRESENT INVENTION relates to a safety arrangement, and more particularly relates to a safety arrangement for use in a motor vehicle.

BACKGROUND OF THE INVENTION

It has been proposed to provide safety-belts and also air-bags for use in motor vehicles to restrain seat occupants during an accident situation. It is known that if the seat-belt and/or air-bag can prevent a seat occupant from reaching the dashboard or steering wheel in front of the seat during an accident, then the risk of injury to the seat occupant may be minimised.

In any accident situation the energy that has to be absorbed by the seat-belt and/or air-bag to prevent a seat occupant from reaching the dashboard or striking it at high velocity, depends upon a number of different factors including the severity of the accident or, in other words, the degree of deceleration experienced by the cabin of the vehicle, and also the weight of the seat occupant. It is clear that more energy has to be absorbed when the seat is occupied by a heavy person than if the seat is occupied by a light person.

It has been proposed to utilise a force limiter associated with a safety-belt for a seat occupant, the force limiter being controlled by weight sensors located in the seat. The force limiter may have an adjustable force level, so that the energy absorbed by the force limiter may be adjusted. For example, the force limiter may have a force level (or energy-absorption level) that can be changed from a high level to a low level at a controlled moment after commencement of an accident situation.

It has also been proposed to provide an air-bag with controllable venting, so that the energy absorbed by the air-bag may be adjusted.

It is to be understood that a heavy person is capable of withstanding a higher restraint force than a light person. However, it is desired to keep the deceleration force applied to any seat occupant as low as possible or, alternatively, to apply any high force level that needs to be used for as short a time as possible.

It has been found that the weight sensors utilised in presently proposed safety arrangements of the type discussed above are either very expensive, or have other shortcomings.

The present invention seeks to provide an improved safety arrangement.

SUMMARY OF THE INVENTION

According to one aspect of this invention, there is provided a safety arrangement incorporating a seat-belt to protect an occupant of a vehicle seat, the safety arrangement incorporating a unit to create an output signal representative of the weight of the seat occupant, wherein the unit is configured to create the output signal in response to a first input signal which is a function of a force applied to the seat-belt, and a second input signal which is a function of the acceleration applied to the seat.

Preferably the seat-belt is at least part of a restraining system to restrain the seat occupant in an accident situation, the restraining system being controllable in response to the output signal to adjust the restraining force applied to the seat occupant.

According to another aspect of this invention there is provided a safety arrangement incorporating a restraining system to restrain the occupant of a vehicle seat in an accident situation, the restraining system having a seat-belt to protect the occupant of the seat, the safety arrangement incorporating a unit to create an output signal, the restraining system being controllable in response to the output signal to adjust the restraining force applied to the seat occupant, characterised in that the unit is configured to create the output signal in response to a first input signal which is a function of a force applied to the seat-belt, and a second input signal which is a function of the acceleration applied to the seat.

Conveniently the seat-belt is associated with an adjustable belt force limiter which is adjustable to effect adjustment of the restraining force applied to the seat occupant.

Preferably the restraining system includes a controllable air-bag controlled in response to the output signal to adjust the restraining force applied to the seat occupant.

Advantageously the controllable air-bag has a controllable gas generator to adjust the inflation characteristic of the air-bag.

Preferably the air-bag has controllable adjustable ventilation to adjust the restraining force applied to the seat occupant.

Conveniently the restraining system includes a controllable device controlled in response to the output signal for controllably resisting forward movement of a vehicle seat.

Advantageously the restraining system includes a controllable knee-pad controlled in response to the output signal for controllably resisting forward movement of the knees of a seat occupant.

Conveniently the safety arrangement may incorporate a control unit responsive to the output signal, the control unit being configured to adjust the restraining force applied to the seat occupant so that the restraining force increases with an increase of the force applied to the seat-belt for a predetermined acceleration.

Preferably a control unit is configured to adjust the restraining force by controlling the level of the restraining force to have one of a plurality of predetermined values.

Preferably the control unit selects the time at which the level of the restraining force is changed from one predetermined value to another predetermined value.

Conveniently the arrangement incorporates a control unit to adjust the restraining force in dependence upon a signal representing crash severity.

In one embodiment the safety arrangement incorporates an accelerometer mounted in the front of the vehicle to provide a signal representing crash severity.

In an alternative embodiment the safety arrangement incorporates a sensor to sense, in advance, a potential accident and to provide a signal representing crash severity. Conveniently said sensor comprises a Doppler radar.

Advantageously the output signal is mainly proportional to the first input signal and inversely proportional to the second input signal.

Preferably the second input signal is processed by being passed through a low pass filter.

Preferably the second input signal is processed by being integrated over a period of time, the value of the integral being divided by a value proportional to the length of the period of time.

Advantageously the unit of this invention which creates the output signal additionally responds to a third input signal which is a function related to the speed of the seat-belt withdrawn from a retractor to which the seat-belt is connected.

Preferably the signal related to the seat-belt is indicative of belt acceleration.

Conveniently the unit to create the output signal of this invention is configured to generate the output signal in dependence upon whether the second input signal has reached a first predetermined value, and in dependence upon whether the first input signal indicates that the force applied to the seat-belt is above or below a predetermined value.

Preferably the output signal is generated in dependence upon whether the second input signal indicates that the acceleration is above a first relatively high threshold value, between the first relatively high threshold value and a second relatively low threshold value, or beneath the relatively low threshold value.

In an alternative embodiment of this invention the unit to create the output signal is configured to generate the output signal in dependence upon whether the second input signal has reached a first predetermined value, and in dependence upon whether the first input signal indicates that the force applied to the seat-belt is above or below a predetermined value.

Preferably the output signal is generated in dependence upon whether the first input signal exceeds a first relatively high threshold, is between a first relatively high threshold and a second relatively low threshold, or is beneath the relatively low threshold.

Advantageously the arrangement may incorporate a sensor to sense a force applied to a seat-belt and to generate the first input signal.

Preferably the sensor to sense a force applied to the seat-belt senses motion of a spool on which part of the belt is wound on.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
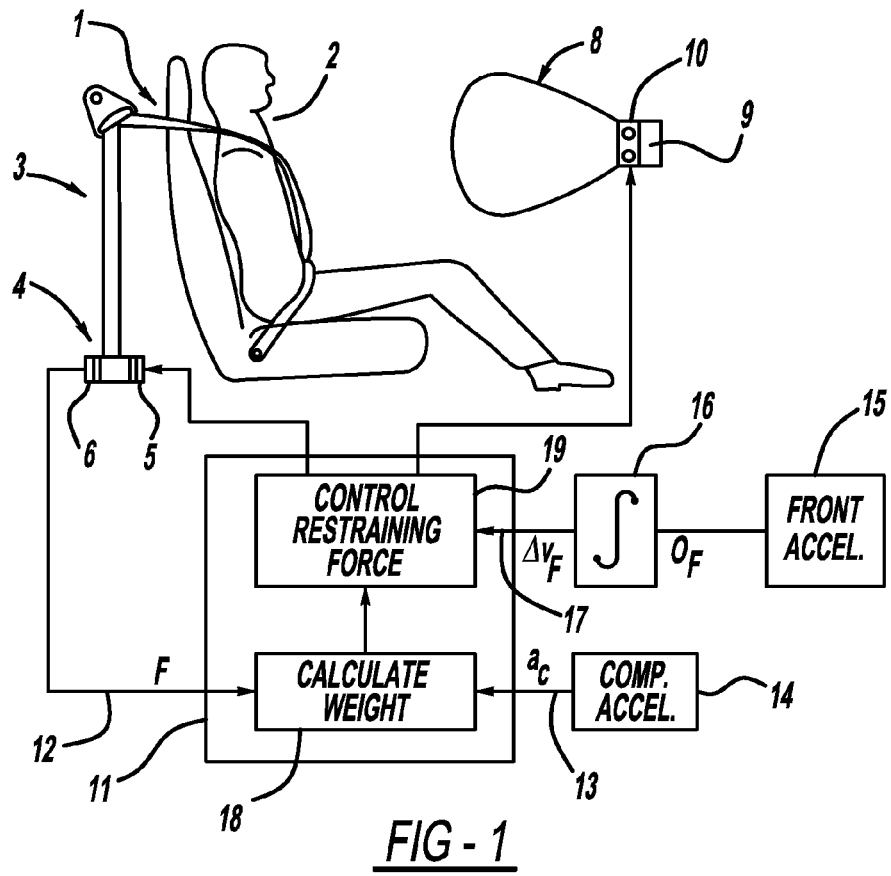
FIG. 1 is a diagrammatic view of a seat occupant and a safety arrangement in accordance with the present invention, including a seat-belt and an air-bag to restrain the occupant, a control arrangement for the system being shown in block diagrammatic form.

Referring initially to FIG. 1 of the accompanying drawings, a seat 1 in a motor vehicle is illustrated, the seat being occupied by a seat occupant 2. The seat 1 is associated with a conventional three-point seat-belt 3 which incorporates a retractor mechanism 4. The retractor mechanism is provided with a controllable force limiter 5 which is configured to control the retarding force applied to the seat occupant 2 by the safety-belt 3 in response to a control signal.

The controllable force limiter 5 may take many alternative forms. For example, the force limiter may comprise one or more torsion bars extending between the spool of the retractor reel to a fixed point, the torsion bars being selectively connectable or dis-connectable from the fixed point. If only one very weak torsion bar remains connected to the fixed point, the force limiter will start to pay-out safety-belt 3, with the absorption of energy, even when subjected to a very low force. However, if all of the torsion bars remain connected to the fixed point, the safety-belt will only be paid-out, with the absorption of energy, when a very large force is applied to the safety-belt. In this latter situation more energy will be absorbed by the force limiter than if only a single torsion bar is connected to the fixed point. Many alternate designs of adjustable force limiter may be utilised.

The retractor mechanism, 4 is also provided with a force measuring unit 6 to measure the force currently applied to the belt. The force measuring unit may simply determine whether the force exceeds a predetermined threshold or not. In a situation where the retractor spool is connected to a fixed point by means of one or more torsion bars, the force-measuring unit 6 may simply determine whether the spool has or has not rotated relative to the fixed point, thus providing an indication as to whether the force necessary to initiate deflection of the torsion bars has, or has not been exceeded. However, the force-measuring unit 6 may be a much more sophisticated force-measuring unit capable of measuring the applied force at any instant. Thus the force-measuring unit 6 may include, for example, a deformable element, the degree of deformation of the deformable element depending upon the applied force. The force-measuring unit 6 may also include one or more Piezo electric elements, being elements which generate an electrical potential across opposed faces thereof dependent upon the pressure or force applied to the element. Other types of force-measuring unit may be utilised.

The seat 1 is also associated with an air-bag 8, illustrated schematically in a partially inflated state, the air-bag 8 being located in front of the seat occupant 2. The air-bag 8 is intended to act as a force limiter or an occupant restraint, limiting (when inflated) the force exerted on the seat occupant 2 in an accident situation. The air-bag 8 is provided with a gas generator 9, and is also provided with a plurality of vent holes 10. The gas generator 9 may be a controllable or multi-level gas generator so that the amount of gas generated may be controlled in response to a control signal. Thus, for example, the gas generator 9 may include two pyrotechnic charges of different sizes. On deployment of the air-bag 8 either one or the other of the charges may be actuated or, alternatively, both of the charges may be actuated, thus giving three different degrees of inflation for the air-bag. The vent holes 10 may be adjustable vent holes, being adjusted in response to a control signal, so that the degree of gas venting from the air-bag may be adjusted.

It is to be understood that by using either the controlled gas generator or the controlled venting, the degree of energy-absorption provided by the air-bag when impacted by the seat occupant 2 may be adjusted.

It is thus to be appreciated that in the embodiment of the invention, as described thus far, both the seat-belt 3 and the air-bag 8 may provide a restraining effect on the body of a seat occupant 2, and the restraining effect provided by the seat-belt 3 may be adjusted by utilising the controllable force-limiter 5, and the restraining effect provided by the air-bag 8 may be adjusted by controlling the adjustable gas generator 9 and/or the adjustable vent holes 10. However, additional controllable force limiters may be provided which serve to provide a controlled restraining effect on a seat occupant.

In the embodiment of the invention illustrated in FIG. 1, both the controllable force-limiter 5, and the air-bag 8 are controlled by signals from a control unit 11. The control unit 11 receives a first input signal F along line 12 from the force-measuring unit 6, the signal F being indicative of the instantaneous force applied to the safety-belt 3. The control unit 11 also receives a second signal ac, along line 13 from an accelerometer 14 which is responsive to the degree of acceleration experienced by the compartment or cabin of the motor vehicle. This is the acceleration experienced by the seat 1, and thus the acceleration that is applied by the seat 1 to the seat occupant 2. The compartment accelerometer may therefore be mounted, for example, on the seat 1 itself or on part of the floor of the vehicle compartment at a point substantially in alignment with the central axis of the vehicle.

A front mounted accelerometer 15 which is mounted, for example, at the front of the vehicle, provides the signals $a_F$, representative of forward velocity. This is integrated in an integrator 16 to provide a signal $\Delta v_F$, the change in forward velocity. It is possible to use $$\Delta v = \int_{to}^{t} a_f \cdot dt$$

where to is the starting time of the crash. The signal $a_F$ can be used to provide an indication of the severity of a crash. The signal $\Delta v_F$ is supplied to the control unit 11 on line 17.

Within the control unit 11 the signals F and ac are fed to a calculator 18 which is a weight calculating device, the operation of which will be described below. The weight calculating device 18 generates a signal representative of the weight of the seat occupant 2 or some other physical characteristic of the occupant which is forwarded to a controller 19 which controls the restraining force provided by the combination of the safety-belt 3 and the air-bag 8. The controller 19 also receives the signal $\Delta v_F$ on the line 17 which is representative of the severity of an accident.

The controller 19 operates to generate control signals which are appropriate for the degree of severity of the accident and also for the weight of the seat occupant to control the controllable force limiter 5 and/or the deployment of the air-bag 8. For example, for a heavy seat occupant and a severe accident, the controller 19 will control the controllable force limiter 5 so that a maximum energy-absorption is provided, and will also control the deployment of the air-bag 8 so that the air-bag is fully inflated and with minimum venting. For a heavy seat occupant and an accident of lesser severity, the controllable force limiter may still be controlled to provide maximum energy-absorption, but the air-bag may be controlled to have a greater degree of venting. It is possible that in accident of this type, the degree of energy-absorption provided by the force limiter 5 may be reduced substantially once the seat occupant 2 has impacted with the air-bag 8, so that the seat occupant is effectively subjected to a substantially constant degree of energy-absorption during the entire forward movement experienced by the seat occupant during an impact.

For a light seat occupant, and a low speed impact, the controller 19 may provide a relatively low degree of energy-absorption from the controllable force limiter 5, and only partial inflation of the air-bag 8, using only one of the pyrotechnic charges, and/or with a relatively high degree of venting from the controllable vents 10.

It is to be appreciated that for a person of intermediate or medium weight, the controllable force limiter 5 and the air-bag 8 will be controlled to provide an intermediate or medium degree of energy-absorption, with the degree of energy-absorption being tempered in view of the degree of severity of the accident.

Whilst, in the embodiment as described thus far, two restraining elements in the form of a safety-belt and an air-bag, are used to restrain the seat occupant, with both the restraining elements being adjustable and controlled, in other embodiments of the invention only one restraining element may be utilised or, if two restraining elements are utilised, only one of the restraining elements may be controlled.

Figure 2:
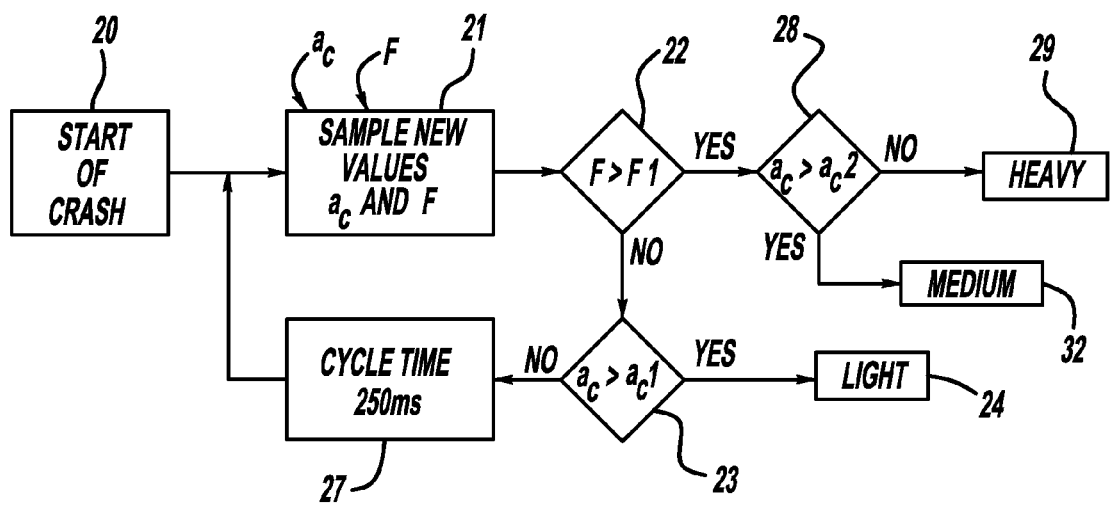
FIG. 2 is a block diagram of a "decision tree"
Figure 3:
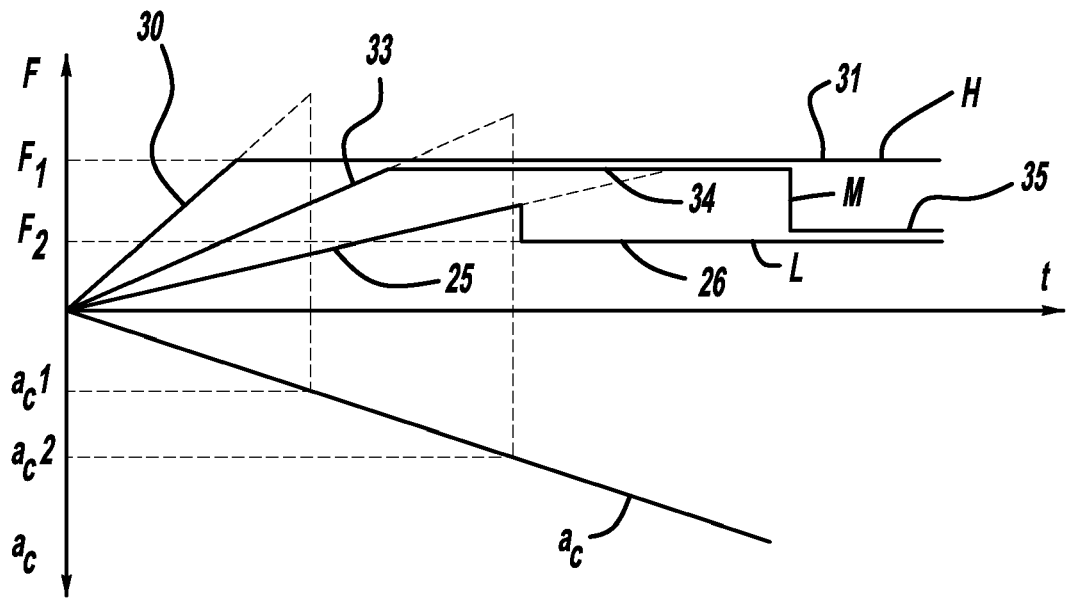
FIG. 3 is a graphical view provided for the purposes of explanation.

Reference will now be made to FIGS. 2 and 3. Here it is to be understood that, for the purposes of explanation, it has been assumed that the force limiter 5 is such that it will commence a force limiting and energy-absorbing effect once a high level force F1 has been achieved within the seat-belt 3, and the force limiter may be controlled to provide a lower level of force limiting or energy-absorption F2 in response to a control signal.

FIG. 2 is a block diagram of a "decision tree", and FIG. 3 is a graphical figure showing, below the axis t, the acceleration signal $a_c$ generated by the accelerometer 14 provided within the compartment of the vehicle, as plotted against time along the horizontal axis. The upper part of the graph of FIG. 3 shows the force experienced by the safety-belt 3 for three weights of occupant, namely a heavy occupant H, a medium weight occupant M and a light weight occupant L shown by lines 30, 33, and 25, respectively.

It can be seen that the acceleration measured by the compartment accelerometer 14 increases (in a negative direction) linearly with time. This may be considered to represent a typical crash event.

Here it is to be understood that the longitudinal force acting on the occupant 2, that is to say the force in the axial direction relative to the motor vehicle, $F_o$ can be indicated to be:

$$F_o = m \cdot a_o,$$

where $a_o$ is the acceleration of the occupant along the axis of the vehicle and m is the mass of the occupant.

Similarly it is to be understood that the force F applied to the safety-belt 3 at any instant can be identified as:

$$F = c_1 \cdot F_o,$$

where $c_1$ is a constant depending upon the belt geometry. Thus the belt force F, which is the force that can be measured by the force measuring unit 6, is directly proportional to $F_o$, and $F_o$ is related to a simple product of the mass of the occupant and the instantaneous acceleration of the occupant.

From this it is possible to deduce that $$m = F/(c_o \cdot a_o)$$

and, to a first approximation, $a_o$ is the same as the compartment acceleration as measured by the compartment accelerometer 14. Consequently it is possible to deduce that at least to a first approximation $m = F/(c_1 \cdot a_c)$.

Thus, in a simple embodiment of the invention, a signal indicative of the mass of the seat occupant may be generated by processing appropriately the signal F provided from the force measuring unit 6 on line 12, and the compartment acceleration signal ac provided on line 13 from the compartment accelerometer 14.

Looking at the "decision tree" of FIG. 2, after the start of the crash, indicated schematically at box 20, samples of values $a_c$ and F are received, as represented in box 21. Initially a determination is made as to whether instantaneous force F is greater than $F_1$, a threshold value equal to the maximum retarding force provided by the force limiter, as represented in box 22. If the force F does not exceed $F_1$, then a determination is made as to whether the acceleration of the compartment ac exceeds a predetermined threshold acceleration $a_{c1}$ as indicated at box 23. If the acceleration ac is greater than $a_{c1}$, then, as shown at box 24, a decision is made that the seat occupant 2 is of light weight.

If the seat occupant 2 is of light weight, the seat occupant will only have a relatively low momentum during an accident situation, thus the force F applied by the light seat occupant to the seat-belt will only rise gradually, as shown by the inclined line 25 in the graphical FIG. 3. Because the force has not reached the upper threshold $F_1$ that may be provided by the controllable force limiter 5 within the period of time necessary to reach the relatively high acceleration $a_{c1}$, the seat occupant 2 must be light. Because the seat occupant 2 is light, only relatively low energy-absorption is required and consequently, the controllable force limiter 5 will, as soon as that determination has been made, be automatically reduced, by the controller 19, to the low energy-absorption level F2, as shown by line 26 in the graphical FIG. 3.

Returning to the "decision tree" of FIG. 2 if, in the decision step shown in box 23, instantaneous acceleration is not greater than $a_{c1}$, then the decision tree recycles, as shown by box 27 to take new samples for $a_c$ and F in box 21. The cycle time is approximately 250 μS. The decision as to whether the experienced force F is greater than $F_1$ is again made in box 22. If the decision is "yes" and the experienced force is greater than force $F_1$, then a further decision is made, as represented, in box 28 as to whether the instantaneous acceleration $a_c$ is greater than a second predetermined threshold value $a_{c2}$. The second predetermined threshold value $a_{c2}$ is less than the first predetermined threshold value $a_{c1}$. If the decision is "no" so that the acceleration is not greater than threshold value $a_{c2}$, a decision is made that the seat occupant is heavy, as shown at box 29.

Returning to the graphical figure, FIG. 3, it can be seen that for a heavy seat occupant, who has a very substantial momentum, during an accident situation the force applied by the seat occupant to the seat-belt rises very rapidly, as shown by the line 30, reaching the threshold $F_1$ before the acceleration has reached the predetermined threshold $a_{c2}$. Because the seat occupant is heavy, the controller controls the controllable force limiter 5 to provide the high retarding force $F_1$ for a long period of time as shown by the line 31.

Returning to the "decision tree" of FIG. 2, should the decision in box 28 be that the instantaneous acceleration ac is greater than the threshold $a_{c2}$, then a decision is made that the seat occupant is of medium weight as indicated at box 32.

As can be seen from the graphical figure, FIG. 3, for a seat occupant of medium weight, having medium momentum, the force applied by the occupant to the belt will rise gradually, as shown by the line 33, the rise of force being greater than that for a light seat occupant, as shown by line 25, but less than that as for a heavy seat occupant as shown by line 30. The medium weight occupant therefore reaches the limiting force $F_1$ in the safety-belt at a point of time between the achievement of the lower acceleration threshold $a_{c2}$ and the higher acceleration threshold act. Because the seat occupant is of medium weight, the controller 19 controls the controllable force limiter 5 to provide the high retarding force $F_1$ for a predetermined period of time, as shown by line 34, and then a lower retarding force $F_1$ for a subsequent period of time as shown by line 35.

It is to be appreciated that in describing the operation of the invention with reference to FIGS. 2 and 3, a very simple embodiment of the invention has been described in which the mass of the seat occupant is determined simply from two input signals, one of which is indicative of the force F measured by the force-measuring unit 6, with the force-measuring unit 6 only being required to indicate whether the instantaneous force does, or does not exceed a predetermined threshold $F_1$, and the acceleration signal $a_c$ generated by the compartment accelerometer 14. Also, of course, the embodiment has been described solely with reference to controlling the controllable force limiter 5, without the added sophistication of controlling the adjustable air-bag 8.

It is to be appreciated, also, that within the embodiment presently described, the force limiter 5 is such that only two levels of force F1 and F2 may be provided by the force limiter.

Figure 4:
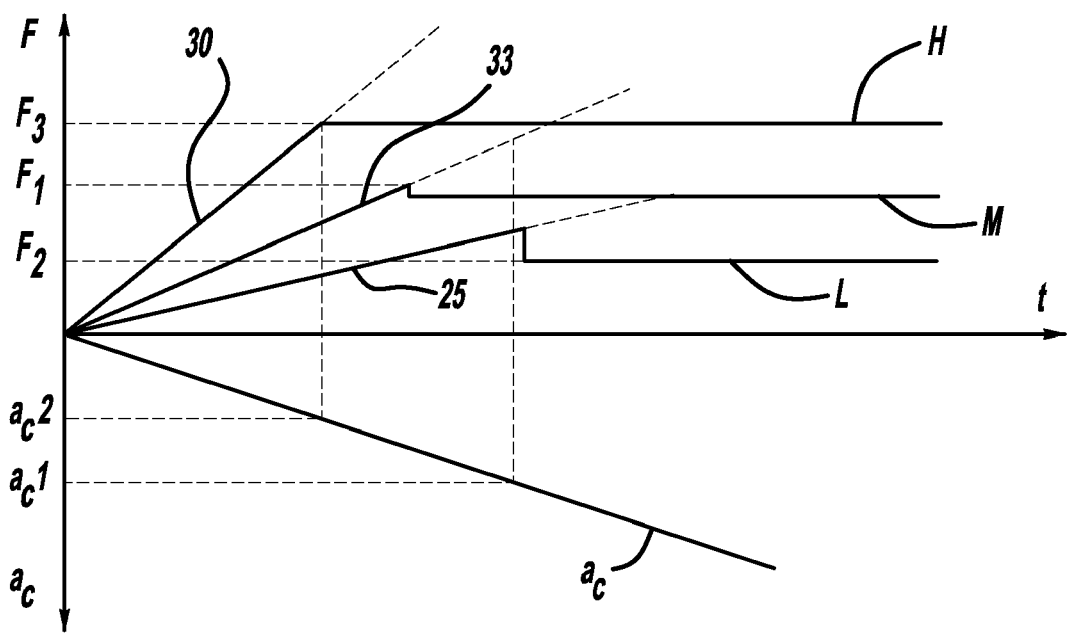
FIG. 4 is another graphical view, again provided for purposes of explanation.

FIG. 4 illustrates an alternative embodiment of the invention in which the force limiter 5 provides three levels of force, there being a third level of force provided by the force limiter, $F_3$, which is higher than the force levels $F_1$ and $F_2$ discussed above. It is apparent, from FIG. 4, that the controller 19 may control the force limiter to provide a very high degree of restraining force $F_3$ for a heavy occupant H, a more modest restraining force $F_1$ for a medium weight occupant M and a lower restraining force $F_2$ for a light weight occupant L.

Figure 5:
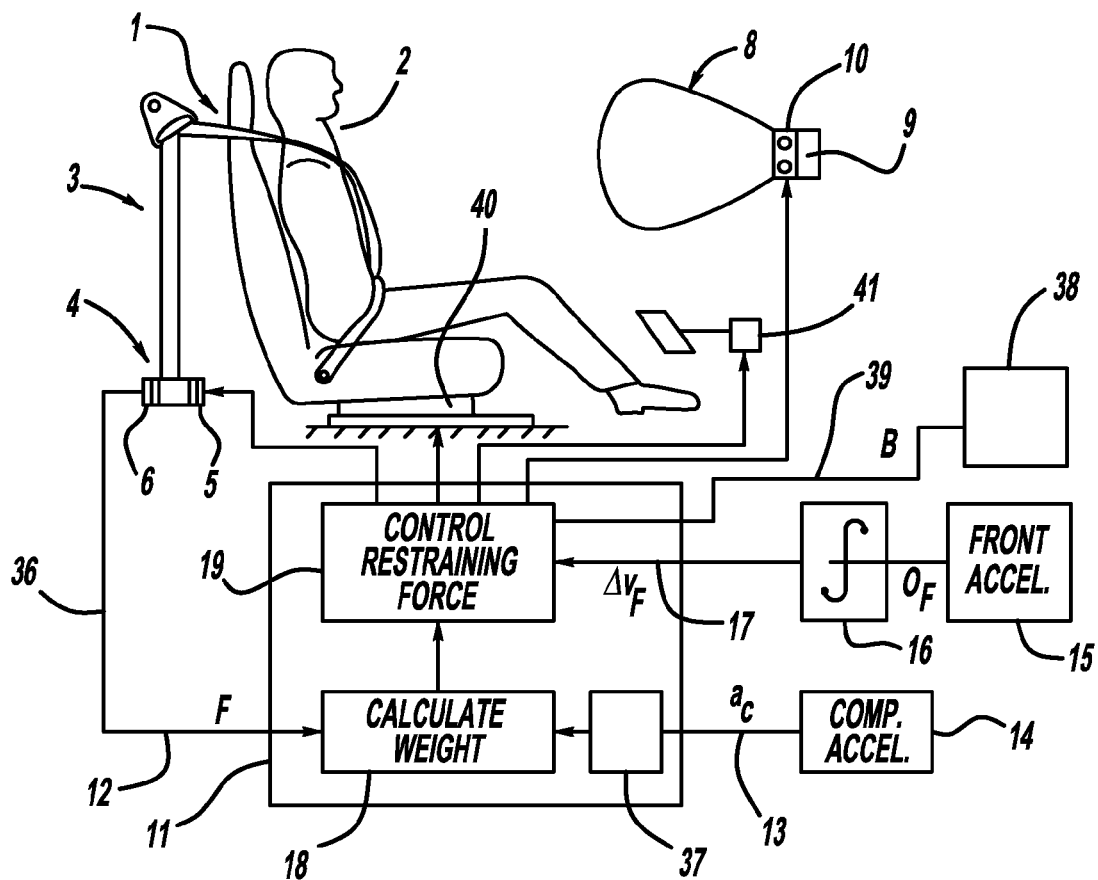
FIG. 5 is a view, corresponding to FIG. 1, of a modified embodiment of the invention.

FIG. 5 is a view corresponding to FIG. 1 illustrating a more sophisticated embodiment of the invention.

All of the features originally present in FIG. 1 have been maintained, and are identified by the same reference numerals. These features will not be re-described, apart from where they have been modified.

In the embodiment of FIG. 5 the force-measuring unit 6 has been modified to provide not only an output signal F on line 12 relating to the force experienced by the belt 3, but also to provide a second signal l" on line 36, representative of the acceleration of belt as it is withdrawn from the retractor 4 following commencement of an accident. Line 36 extends into the control unit 11, and is fed to the calculator unit 18 which calculates the weight of the occupant 2.

The signal $a_c$ from line 13 passes through a smoothing circuit such as a low pass filter or integrator 37 within the control unit 11.

An accident predictor unit, such as Doppler radar 38 mounted on the front of the vehicle is provided, adapted to generate a signal B related to the predicted severity of an accident, the signal being fed, by line 39, to the controller 19 within the control unit 11.

It is to be recalled that in the previously described embodiment, the mass of the occupant was determined using the formula $$m = F/(c_1 \cdot a_o) \approx F/(c_1 \cdot a_c)$$

However, it is to be understood that in reality $a_o$, the acceleration experienced by the seat occupant can more truly be represented as $a_o = a_c + s''$, where $a_c$ is the compartment acceleration and s is the position of the occupant relative to the compartment, s" being the relative acceleration of the occupant to the compartment.

The length of belt l paid-out at any time is $$l = (s/c_1) + c_2, \text{ (or } s = c_1 l - c_1 c_2)$$

where $c_2$ depends upon a reference system and $c_1$ is a factor which normally increases only slightly with increasing belt length l and which, for the purposes of the present explanation, can be considered to be a constant.

This gives $$m = F/(c_1 \cdot a_c + c_1^2 \cdot 1'') \quad (\text{as } s'' = c_1 l'')$$

where l'' is the acceleration of the belt as it is withdrawn. Here it is to be noted that if the belt 1 has a degree of elasticity, as is conventional, or if the belt spool can continue to move, even with the absorption of energy, after the spool has locked, then the occupant 2 will not actually accelerate or decelerate in the same manner as the vehicle—but the seat occupant will move relative to the vehicle.

Thus m can be estimated more accurately by measuring F, $a_c$ and l''. Thus, in the embodiment of FIG. 5, an arrangement is provided for measuring the acceleration of the belt 3 as it is withdrawn.

If the mass is to be estimated before the limiting force $F_1$ of the force limiter is reached, but where the elasticity of the belt cannot be neglected, then it is necessary to appreciate that $$l'' = \Delta l'' = l_o \cdot F''/k$$

where $l = l_o + \Delta l$ and $F = k \, \Delta l/l_o$, where $\Delta l$ is the elongation of the belt, $l_o$ is the untensioned length of the belt and k is the module of elasticity, and F'' is the second differential of F with respect to time.

Thus $$m = F/(c_1 \cdot a_c + c_1 \cdot l_o F''/k).$$

It is to be appreciated, therefore, that in advanced embodiments of the invention sophisticated calculating techniques may be used to calculate the mass of the seat occupant.

It can be found that the instantaneous acceleration value given from a compartment accelerometer, such as the compartment accelerometer 14 fluctuates rapidly with time. It is appropriate, therefore, to process this signal in a suitable way to provide an acceptable value. This can be achieved by using a low pass filter or, preferably, by taking the mean value of "sliding window" using an integrator such as the integrator 37.

If a "sliding window" is used, then $$\overline{a_{\Delta 1}(t)} = \frac{1}{\Delta t} \int_{t-\Delta t}^{t} a_c \cdot dt$$

where $\Delta t$ is the width of the window. Effectively one is integrating the signal with time over a brief "window" of time $\Delta t$, and then dividing the integrated signal by the value $\Delta t$ which is the width of the window. This gives a "smoothed" acceleration signal.

Normally the controllable force limiter 5 has to be controlled in the early phase of an accident situation, whereas the air-bag ventilation may be controlled in a much later phase of the accident situation. Since calculations have to be performed during the very opening phase of the crash to enable the force limiter 5 to be controlled appropriately, if the restraining force is to be moderated, not only in response to the weight of the seat occupant 2, but also in response to the violence of the crash, it is necessary to use the integrated signal $\Delta v_F$ from the integrator 16 associated with the front accelerometer 15. However, even this signal may not be totally reliable during the very early instance of a crash. Consequently it is preferred to use a pre-crash sensor like a Doppler radar 38 which is capable of generating a signal B indicative of the anticipated severity of a crash. A Doppler radar would be able to work out the relative velocity of the vehicle and an object in front of the vehicle with which an impact may occur.

The embodiment of FIG. 5 includes controlled force limiting devices in addition to the seat-belt 3 and the air-bag 8. The controller 19 controls a first additional force limiter in the form of a controllable seat support 40 which may permit the seat 1 to move forwardly, with the absorption of energy. The controllable seat support 40 is controlled so that the energy absorbed as the seat moves forwardly is much greater if the seat occupant is heavy, than if the seat occupant is light. Also, in FIG. 5, a controllable energy absorbing knee-pad 41 is provided, to absorb energy as the knees of the seat occupant 2 move forwardly. Again the energy absorbed for a predetermined movement of the knee-pad is controlled to be much greater for a heavy seat occupant than a light one.

While the above description constitutes the preferred embodiment of the present invention, it will be appreciated that the invention is susceptible to modification, variation and change without departing from the proper scope and fair meaning of the accompanying claims.

The invention claimed is:

1. A safety arrangement incorporating a seat-belt to protect an occupant of a vehicle seat, the seat-belt is part of a restraining system to restrain the occupant in a collision situation, the safety arrangement comprising a unit to create an output signal representative of the weight of the seat occupant, the unit producing the output signal in response to a first input signal (F) which is a function of a force applied to the seat-belt by the occupant in a collision, and a second input signal ($a_c$) which is a function of the acceleration of the seat in the collision, the restraining system being controllable in response to the output signal to adjust the restraining force applied to the occupant.

2. A safety arrangement according to claim 1 wherein the seat-belt is associated with a retractor mechanism having a controllable force limiter which is adjustable to affect the restraining force applied to the seat occupant.

3. A safety arrangement according to claim 1 wherein the restraining system includes a controllable air-bag controlled in response to the output signal to adjust the restraining force applied to the occupant.

4. A safety arrangement according to claim 3 wherein the controllable air-bag has a controllable gas generator to adjust the inflation characteristic of the air-bag.

5. A safety arrangement according to claim 3 wherein the air-bag has controllable adjustable ventilation to adjust the restraining force applied to the occupant.

6. A safety arrangement according to claim 1 wherein the restraining system includes a controllable seat support for controllably resisting forward movement of the seat in response to the output signal.

7. A safety arrangement according to claim 1 wherein the restraining system includes a controllable knee-pad controlled in response to the output signal for controllably resisting forward movement of the knees of the occupant.

8. A safety arrangement according to claim 1 incorporating a control unit responsive to the output signal, the control unit being configured to adjust the restraining force applied to the occupant so that the restraining force increases with an increase of the force applied to the seat-belt by the occupant in a collision.

9. A safety arrangement according to claim 8 wherein the control unit is configured to adjust the restraining force by controlling the level of the restraining force to have one of a plurality of predetermined values.

10. A safety arrangement according to claim 9 wherein the control unit selects a time at which the level of the restraining force is changed from one predetermined value to another of the predetermined values.

11. A safety arrangement according to claim 1 wherein the arrangement incorporates a control unit to adjust the restraining force in dependence upon a crash severity signal representing the severity of the collision.

12. A safety arrangement according to claim 11 wherein the safety arrangement incorporates an accelerometer mounted in the front of the vehicle to provide the crash severity signal.

13. A safety arrangement according to claim 11 wherein the safety arrangement incorporates a sensor to sense, in advance of a collision, a potential accident and to provide the crash severity signal.

14. A safety arrangement according to claim 13 wherein the sensor comprises a Doppler radar sensor.

15. A safety arrangement according to claim 1 wherein the output signal is mainly proportional to the first input signal and inversely proportional to the second input signal.

16. A safety arrangement according to claim 1 wherein the second input signal is processed by being passed through an integrator.

17. A safety arrangement according to claim 1 wherein the second input signal is processed by being integrated over a period of time, the value of such integration being divided by a value proportional to the length of the period of time.

18. A safety arrangement according to claim 1 wherein the unit which additionally responds to a third input signal which is a function related to the speed of the seat-belt withdrawn from a retractor to which the seat-belt is connected.

19. A safety arrangement according to claim 18 wherein the signal related to the seat-belt is indicative of belt acceleration (l").

20. A safety arrangement according to claim 1 wherein the unit is configured to generate the output signal in dependence upon whether the first input signal indicates that the force applied to the seat-belt has exceeded a predetermined force threshold value, and in dependence upon whether the second input signal indicates that the acceleration has a predetermined value relative to at least one predetermined acceleration threshold value.

21. A safety arrangement according to claim 1 wherein the output signal is generated in dependence upon whether the second input signal indicates that the acceleration is above a first relatively high acceleration threshold value, between the first relatively high acceleration threshold value and a second relatively low acceleration threshold value, or beneath the relatively low acceleration threshold value.

22. A safety arrangement according to claim 1 wherein the unit is configured to generate the output signal in dependence upon whether the second input signal has reached a first acceleration predetermined value, and in dependence upon whether the first input signal indicates that the force applied to the seat-belt is above or below a predetermined force value.

23. A safety arrangement according to claim 1 wherein the output signal is generated in dependence upon whether the first input signal exceeds a first relatively high force threshold, is between a first relatively high threshold and a second relatively low threshold, or is beneath the relatively low threshold.

24. A safety arrangement according to claim 1 incorporating a sensor to sense a force applied to a seat-belt and to generate the first input signal.

25. A safety arrangement according to claim 24 wherein the sensor to sense a force applied to the seat-belt senses motion of a retractor spool on which part of the seat-belt is wound on.

* * * * *